(12) United States Patent
Li et al.

(10) Patent No.: US 11,053,132 B2
(45) Date of Patent: Jul. 6, 2021

(54) LIGHT VALVE COMPRISING HALIDE ABX₃ PEROVSKITE PARTICLES

(71) Applicant: ZHEJIANG JINGYI NEW MATERIAL TECHNOLOGY CO. LTD, Zhejiang (CN)

(72) Inventors: Yanan Li, Montreal (CA); Dawei Zhang, Lachine (CA); Shiyong Zhao, Longueuil (CA); Shuyong Xiao, St-Laurent (CA); Bin Liang, Zhejiang (CN); Yuzhe Zhang, Zhejiang (CN)

(73) Assignee: ZHEJIANG JINGYI NEW MATERIAL TECHNOLOGY CO. LTD, Zhejiang (CN)

( * ) Notice: Subject to any disclaimer, the term of this patent is extended or adjusted under 35 U.S.C. 154(b) by 0 days.

(21) Appl. No.: 17/044,318

(22) PCT Filed: Jul. 9, 2019

(86) PCT No.: PCT/CN2019/095218
§ 371 (c)(1),
(2) Date: Sep. 30, 2020

(87) PCT Pub. No.: WO2020/011150
PCT Pub. Date: Jan. 16, 2020

(65) Prior Publication Data
US 2021/0026214 A1 Jan. 28, 2021

Related U.S. Application Data

(63) Continuation of application No. 16/033,556, filed on Jul. 12, 2018, now abandoned.

(51) Int. Cl.
| | |
|---|---|
| *C01D 17/00* | (2006.01) |
| *G02F 1/155* | (2006.01) |
| *G02F 1/17* | (2019.01) |
| *G02F 1/169* | (2019.01) |
| *C01G 17/00* | (2006.01) |
| *C01G 17/04* | (2006.01) |
| *C01G 19/00* | (2006.01) |
| *C01G 19/04* | (2006.01) |
| *C01G 21/00* | (2006.01) |
| *C01G 21/16* | (2006.01) |
| *B82Y 20/00* | (2011.01) |
| *B82Y 30/00* | (2011.01) |

(52) U.S. Cl.
CPC .......... *C01D 17/003* (2013.01); *C01D 17/00* (2013.01); *C01G 17/006* (2013.01); *C01G 17/04* (2013.01); *C01G 19/006* (2013.01); *C01G 19/04* (2013.01); *C01G 21/006* (2013.01); *C01G 21/16* (2013.01); *G02F 1/155* (2013.01); *G02F 1/169* (2019.01); *G02F 1/172* (2013.01); *B82Y 20/00* (2013.01); *B82Y 30/00* (2013.01); *C01P 2002/34* (2013.01); *C01P 2004/16* (2013.01); *C01P 2004/64* (2013.01); *G02F 2202/36* (2013.01)

(58) Field of Classification Search
CPC ...... G02F 2202/36; G02F 1/169; G02F 1/172; G02F 1/155; G02F 1/153; G02F 1/15; C01G 17/006; C01G 17/04; C01G 19/006; C01G 19/04; C01G 21/006; C01G 21/16; C01P 2002/34; C01P 2004/16; C01D 17/00
See application file for complete search history.

(56) References Cited

U.S. PATENT DOCUMENTS

| | | |
|---|---|---|
| 3,585,381 A | 6/1971 | Hodson et al. |
| 5,409,734 A | 4/1995 | Lee et al. |
| 6,334,967 B1 | 1/2002 | Saxe et al. |
| 6,606,185 B2 | 8/2003 | Saxe |
| 6,646,782 B1 | 11/2003 | Russell et al. |
| 7,585,474 B2 | 9/2009 | Wong et al. |
| 9,581,877 B2 | 2/2017 | Bass et al. |
| 2006/0097233 A1 | 5/2006 | Pichot et al. |
| 2012/0133672 A1 | 5/2012 | Joo |
| 2014/0159549 A1 | 6/2014 | Kubo et al. |

(Continued)

FOREIGN PATENT DOCUMENTS

| | | |
|---|---|---|
| CN | 101628810 A | 1/2010 |
| CN | 106970476 A | 7/2017 |

OTHER PUBLICATIONS

Search Report dated Oct. 23, 2020 for European patent application No. 19817926.9, 8 pages.
Lin Jia et al: "Thermochromic halide perovskite solar cells", Nature Materials, Nature Pub. Group, London, vol. 17, No. 3, Jan. 22, 2018, pp. 261-267.
Lance M. Wheeler et al: "Switchable photovoltaic windows enabled by reversible photothermal complex dissociation from methylammonium lead iodide", Nature Communications, vol. 8, No. 1, Nov. 23, 2017, pp. 1-9.
International Search Report for PCT/CN2019/095218 dated Sep. 26, 2019, ISA/CN.

(Continued)

*Primary Examiner* — Steven J Bos
(74) *Attorney, Agent, or Firm* — Yue (Robert) Xu; Apex Attorneys at Law, LLP

(57) ABSTRACT

A light valve containing ABX₃ perovskite particles (200) suspended in a liquid suspension (300) that can control light transmittance is provided. The preferable ABX₃ perovskite particles (200) are halide ABX₃ perovskite particles wherein A is at least one of $Cs^+$, $CH_3NH_3^+$, and $Rb^+$, B is at least one of $Pb^{2+}$, $Ge^{2+}$, and $Sn^{2+}$, and X is at least one of $Cl^-$, $Br^-$, and $I^-$. Use of the light valve in the manufacture of a light control device and a method of controlling light transmittance by using the light valve are also provided.

4 Claims, 3 Drawing Sheets

(56) References Cited

U.S. PATENT DOCUMENTS

2016/0111224 A1* 4/2016 Charbonneau ...... H01L 51/0003
                                                    136/255
2017/0077402 A1  3/2017 Oooka et al.
2017/0155036 A1  6/2017 Kubota et al.
2017/0217785 A1* 8/2017 Yang ................ H01L 21/02422

OTHER PUBLICATIONS

Sampson Adjokatse, Hong-Hua Fang and Maria Antonietta Loi, Broadly tunable metal halide perovskites for solid-state light-emission applications,Materials Today, pp. 413-424 vol. 20, No. 8, Oct. 2017 (Year: 2017).

Yichuan Ling, Zhao Yuan, Yu Tian, Xi Wang, Jamie C. Wang, Yan Xin, Kenneth Hanson, Biwu Ma, and Hanwei Gao, Bright Light-Emitting Diodes Based on Organometal Halide Perovskite Nanoplatelets, Adv. Mater. 2016, 28, 305-311 (Year: 2016).

Zhi-Jun Li, Elan Hofman, Andrew Hunter Davis, Mathew M. Maye, and Weiwei Zheng, General Strategy for the Growth of $CsPbX_3$ (X=Cl, Br, I) Perovskite Nanosheets from the Assembly of Nanorods, Chem. Mater. 2018, 30, 3854-3860 (Year: 2018).

Haifeng Yuan, Elke Debroye, Giorgio Caliandro, Johan Hofkens, and Maarten B. J. Roeffaers, Photoluminescence Blinking of Single-Crystal Methylammonium Lead Iodide Perovskite Nanorods Induced by Surface Traps, ACS Omega 2016, 1, 148-159 ( Year: 2016).

Akihiro Kojima, et al., Organometal Halide Perovskites as Visible-Light Sensitizers for Photovoltaic Cells, J. Am. Chem. Soc. 131, 6050-6051, 2009.

Tan, Zhi-Kuang, et al., Bright light-emitting diodes based on organometal halide perovskite, Nature Nanotechnology, 9: 687-692, Aug. 3, 2014.

Zhu, Haiming, et al., Lead halide perovskite nanowire lasers with low lasing thresholds and high quality factors, Nature Mater., 14: 636-642, Apr. 13, 2015.

Yang, Zhenqian, et al., High-Performance Single-Crystalline Perovskite Thin-Film Photodetector, Adv. Materials, 30(8):1704333, 2018.

Xiao, Zhengguo, et al., Energy-Efficient Hybrid Perovskite Memristors and Synaptic Devices, Advanced Electronic Materials, 2(7): 1600100, 2016.

The U.S. 1st Office Action dated Feb. 8, 2019 for U.S. Appl. No. 16/033,556.

The U.S. 2nd Office Action dated May 17, 2019 for U.S. Appl. No. 16/033,556.

The U.S. 3rd Office Action dated Oct. 8, 2019 for Application No. 16/033,556.

The U.S. 4th Office Action dated Jan. 17, 2020 for U.S. Appl. No. 16/033,556.

* cited by examiner

LIGHT VALVE COMPRISING HALIDE ABX₃ PEROVSKITE PARTICLES

CROSS REFERENCE TO RELATED APPLICATIONS

This application is a U.S. National Phase application based on upon PCT Application No. PCT/NC2019/095218, filed on Jul. 9, 2019, which claims the priority of U.S. patent application Ser. No. 16/033,556, filed on Jul. 12, 2018. and titled with "Halide $ABX_3$ perovskite particles and their application in controlling photo-flux", and the disclosures of which are hereby incorporated by reference.

FIELD

The present invention is related to a light valve containing perovskite particles especially $ABX_3$ perovskite particles. The present invention also provides a new use of the light valve and a method of controlling light transmittance by using the light valve.

BACKGROUND

A light valve is a device which can electronically control the light transmittance, and such a device is also scientifically referred as electrochromic device. Technically, a light valve is a device that can regulate the amount of light passing through a media like a water valve that can control the water flow. Depending on science behind an electrochromic device, it can be further classified as polymer dispersed liquid crystal (PDLC) (U.S. patent U.S. Pat. No. 3,585,381), electrochemical device (EC) (U.S. patent U.S. Pat. No. 9,581,877) and suspension particles display (SPD) (U.S. patents U.S. Pat. No. 6,606,185). However, these light valves in the prior art are not satisfied in respect of transmittance, economical efficiency (energy-saving), easy-controlling and/or easy-using.

Therefore, a new light valve solving one or more of the above disadvantages is in urgent need in the field.

SUMMARY

It is surprisingly found by the inventors that perovskite particles can be used in a light valve. Particularly, it is surprisingly found that perovskite particles, especially halide $ABX_3$ perovskite particles suspended in a liquid suspension can be polarized under an electric field and be oriented.

Perovskite, originated from the Russian geologist Perovski and originally single-pointed the calcium titanate ($CaTiO_3$) mineral. Later, crystals with similar structures were collectively referred to as perovskites. It is surprisingly found that the perovskite particles, especially halide $ABX_3$ perovskite particles have unexpected property of being polarized and oriented under an electric field. The cell structure of the halide $ABX_3$ perovskite is shown in FIG. 3, where 'A' and 'B' are two cations of very different sizes, and 'X' is an anion that bonds to both. Preferably, in this invention, 'A' is an alkaline cation or organic ammonium, which has a positive charge, 'B' is a transition metal cation or an alkaline earth cation, which has two positive charges; and 'X' is a halide anion, which has a negative charge. Among them, 'B' cation and 6 'X' anions form octahedral units, and 8 octahedral units occupy the position of the hexahedral apex centered on the 'A' cation.

$ABX_3$ perovskite material is known in the art and there are a lot of reports on the applications thereof. In 2009, the $ABX_3$ perovskite material was first reported for solar cells (J. Am. Chem. Soc. 131, 6050-6051, 2009). "Science" rated perovskite solar cells as one of the top 10 scientific breakthroughs in 2013. In January 2018, the Swiss Federal Institute of Technology in Lausanne set a new world record efficiency of 23.25% for a perovskite solar cell. In addition, the ABX3 perovskite material has been explored in other potential applications, such as LED (Light Emitting Diodes) (Tan, Zhi-Kuang, et al., Nature Nanotechnology, 9: 687-692, 2014), Lasers (Haiming Zhu, et al., Nature Mater., 14: 636-642, 2015), Photodetectors (Zhenqian Yang, et al., Adv. Materials, 30(8):1704333, 2018), Memristors (Zhengguo Xiao, et al., Advanced Electronic Materials, 2(7): 1600100, 2016).

Based on the above finding, in the first aspect, a light valve is provided, which comprises a first layer of a transparent conductive substrate; an active layer containing perovskite particles suspended in a liquid suspension; and a second layer of transparent conductive substrate.

Preferably, the perovskite particles are $ABX_3$ perovskite particles, especially halide $ABX_3$ perovskite particles. Preferably, A is at least one of $Cs^+$, $CH_3NH_3^+$, and $Rb^+$, B is at least one of $Pb^{2+}$, $Ge^{2+}$, and $Sn^{2+}$, and X is at least one of $Cl^-$, $Br^-$, and $I^-$. More preferably, A is at least one of $Cs^+$ and $CH_3NH_3^+$, B is $Pb^{2+}$ X is at least one of $Br^-$ and $I^-$.

Preferably, the perovskite particles have a non-spherical morphology.

Preferably, the perovskite particles have a morphology of nanorods (one-dimensional), nanosheets (two-dimensional), cuboids, or irregular (three-dimensional) particles.

It is further found surprisingly that when the perovskite particles have a morphology of nanorods, the light valve has a higher light transmittance in on-state (when the light value is turned on) than off-state (when the light valve is turned off). More preferably, the light valve has a high light transmittance in on-state and has a low light transmittance in off-state.

Particularly, the perovskite particles (including the halide $ABX_3$ perovskite particles) have a morphology of nanorods. Preferably, for the nanorods, it has a length of 50 nm-2000 nm, more preferable 200 nm-500 nm, and a thickness or diameter of 20 nm-200 nm, more preferable 50 nm-100 nm. Preferably, for the nanorods, the ratio of length:thickness or length:diameter is above 3:1, 4:1, 5:1, 6:1, 8:1 or 10:1. Preferably, the ratio of length : thickness or length:diameter is 3:1 to 20:1, more preferably 8:1 to 15:1. Preferably, the perovskite particles (including the halide $ABX_3$ perovskite particles) have a morphology of nanorods which have a length of 50 nm-2000 nm, a thickness or diameter of 20 nm-200 nm and a ratio of length:thickness or length:diameter above 3:1. Preferably, the perovskite particles (including the halide $ABX_3$ perovskite particles) have a morphology of nanorods which have a length of 50 nm-2000 nm, a thickness or diameter of 2.0 nm-200 nm and a ratio of length:thickness or length:diameter of 8:1 to 15:1. More preferably, the perovskite particles (including the halide $ABX_3$ perovskite particles) have a morphology of nanorods which have a length of 200 nm-500 nm, a thickness or diameter of 50 nm-100 nm and a ratio of length:thickness or length:diameter of 8:1 to 15:1.

Preferably, the perovskite particles are uniformly dispersed in the liquid suspension.

Preferably, the liquid suspension maintains the suspended perovskite particles in gravitational equilibrium.

Preferably, the liquid suspension further comprises one or more of a mineral resistive material, a synthetic resistive material, and a vegetable oil.

Preferably, the liquid suspension is sandwiched between the two layers of transparent conductive substrate as electrodes.

In a further aspect of the invention, a method of controlling light transmittance is provided, comprising using the light valve according to the present invention in a light control device. In some cases, the light valve per se is used as the light control device. In some cases, the light valve is a part of the light control device.

In a further aspect of the invention, the present invention relates to use of the light valve according to the invention in the manufacture of a light control device.

In some preferred embodiments, the light control device is selected from the group consisting of a smart window, a rear window of a car, a lense, a light shutter and a display.

In a further aspect of the invention, the present invention relates to a light valve as described herein, for use in controlling light transmittance.

This invention presents a method of controlling the flux of light in a light control device by using perovskite particles, especially by using halide $ABX_3$ perovskite particles. The present invention provides a new use of perovskite material especially $ABX_3$ perovskite, and method to make such a material. The present invention further provides a light valve, comprising a liquid suspension having such a material of perovskite material, which can electronically control transmission of light. More specifically, the perovskite material is $ABX_3$ perovskite particles, wherein A is at least one of $Cs^+$, $CH_3NH_3^+$, and $Rb^+$, B is at least one of $Pb^{2+}$, $Ge^{2+}$, and $Sn^{2+}$, and X is at least one of $Cl^-$, $Br^-$, and $I^-$. The halide $ABX_3$ perovskite particles preferably have a non-spherical morphology. The non-spherical morphology of the halide $ABX_3$ perovskite particles is at least one of nanowires, nanorods (one-dimensional); nanosheets (two-dimensional); cuboids, irregular (three-dimensional) particles. Particularly, the perovskite particles (including the halide $ABX_3$ perovskite particles) have a morphology of nanorods. Preferably, for the nanorods, it has a length of 50 nm-2000 nm, more preferable 200 nm -500 nm, and a thickness or diameter of 20 nm-200 nm, more preferable 50 nm-100 nm.

Preferably, for the nanorods, the ratio of length:thickness or length:diameter is above 3:1, 4:1, 5:1, 6:1, 8:1 or 10:1. Preferably, the ratio of length:thickness or length:diameter is 3:1 to 20:1, more preferably 8:1 to 15:1. Preferably, the perovskite particles (including the halide $ABX_3$ perovskite particles) have a morphology of nanorods which have a length of 50 nm-2000 nm, a thickness or diameter of 20 nm-200 nm and a ratio of length:thickness or length:diameter above 3:1. Preferably, the perovskite particles (including the halide $ABX_3$ perovskite particles) have a morphology of na.norods which have a length of 50 nm-2000 nm, a thickness or diameter of 20 nm-200 nm and a ratio of length: thickness or length diameter of 8:1 to 15:1. More preferably, the perovskite particles (including the halide $ABX_3$ perovskite particles) have a morphology of nanorods which have a length of 200 nm-500 nm, a thickness or diameter of 50 nm-100 nm and a ratio of length:thickness or length:diameter of 8:1 to 15:1.

According to this invention, the liquid suspension, which is used as a liquid medium to suspend the perovskite particles, comprises one or more a mineral resistive oil, a synthetic resistive oil, and a vegetable oil.

According to this invention as illustrated in FIG. 1, the transparent electrode (100) can be made of the same material or different materials, where light can be transmitted through, preferably having a light transmittance equals to or greater than 80%.

DETAILED DESCRIPTION

The present invention provides a new form of perovskite particles and the method to use them to control the flux of light in a light control device, or referred as a light valve.

Figure 1:
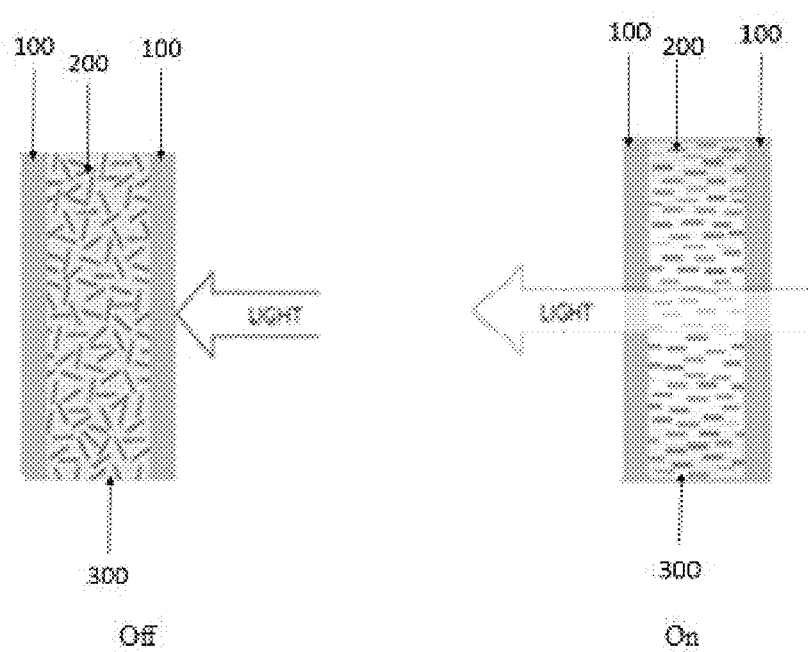
FIG. 1 presents schematically a light controlling device, wherein, a liquid suspension (300) is sandwiched between two transparent substrates (100) and (100). The halide $ABX_3$ perovskite particles (200) are suspended in the liquid suspension (300).

FIG. 1 presents schematically a light controlling device, wherein, a liquid suspension (300) is sandwiched between two transparent substrates (100) and (100). The halide $ABX_3$ perovskite particles (200) are suspended in the liquid suspension (300). In the absence of an applied electrical field (OFF state), the halide $ABX_3$ perovskite particles in the liquid suspension assume random positions due to Brownian movement. Hence, a beam of light passing into the light valve is absorbed/scattered. The light valve is thus relatively dark in the OFF state. When an electric field is applied thereto (ON state), the light control halide $ABX_3$ perovskite particles are polarized, thereby being arranged in directions parallel to each other in accordance with the electric field, and most of the light can pass through the cell. The light valve is thus relatively transparent in the ON state.

The present invention provides a new use of $ABX_3$ perovskite particles, and method to make such a material. The present invention further provides a light valve, comprising a liquid suspension having $ABX_3$ perovskite particles, which can electronically control transmission of light. More specifically, for the $ABX_3$ perovskite particles, A is at least one of $Cs^+$, $CH_3NH_3^+$, and $Rh^+$, B is at least one of $Pb^{2+}$, $Ge^{2+}$, and $Sn^{2+}$, and X is at least one of $Cl^-$, $Br^-$, and $I^-$. In case that X is at least one of $Cl^-$, $Br^-$, and $I^-$, the $ABX_3$ perovskite particles are also referred to as halide $ABX_3$ perovskite particles. Sill more preferably, A is at least one of $Cs^+$ and $CH_3NH_3^+$, B is $Pb^{2+}$, X is at least one of $Br^-$ and $I^-$.

Preferably, the halide $ABX_3$ perovskite particles have a non-spherical morphology. The non-spherical morphology is at least one of the nanowires, nanorods (one-dimensional); nanosheets (two-dimensional); cuboids, irregular (three-dimensional) particles.

Particularly, the perovskite particles (including the halide $ABX_3$ perovskite particles) have a morphology of nanorods. Preferably, for the nanorods, it has a. length of 50 nm-2000 nm, more preferable 200 nm -500 nm, and a thickness or diameter of 20 nm-200 nm, more preferable 50 nm-100 nm. Preferably, for the nanorods, the ratio of length:thickness or length:diameter is above 3:1, 4:1, 5:1, 6:1, 8:1 or 10:1. Preferably, the ratio of length:thickness or length:diameter is 3:1 to 20:1, more preferably 8:1 to 15:1. Preferably, the perovskite particles (including the halide $ABX_3$ perovskite particles) have a morphology of nanorods which have a length of 50 nm-2000 nm, a thickness or diameter of 20 nm-200 nm and a ratio of length:thickness or length:diameter above 3:1. Preferably, the perovskite particles (including the halide $ABX_3$ perovskite particles) have a morphology of nanorods which have a length of 50 nm-2000 nm, a thickness or diameter of 20 nm-200 nm and a ratio of length:thickness or length:diameter of 8:1 to 15:1. More preferably, the perovskite particles (including the halide $ABX_3$ perovskite particles) have a morphology of nanorods which have a length of 200 nm-500 nm, a thickness or diameter of 50 nm-100 nm and a ratio of length:thickness or length:diameter of 8:1 to 15:1.

In the disclosure, the length, thickness or diameter means an average length, an average thickness or an average diameter, respectively.

As illustrated in FIG. 1, the $ABX_3$ perovskite particles (200) which are encapsulated inside the said liquid suspension (300) shall be capable of re-orientating themselves in an electronic field. In terms of geometric dimensions, the $ABX_3$ perovskite particles are preferably in a form of nanorods having an average length of about 50 nm-2000 nm, and an average thickness or diameter of 20 nm-200 nm, and a ratio of length:thickness or length:diameter above 3:1, preferably 8:1 to 15:1.

According to this invention, the liquid suspension (300), which is used as a liquid medium to suspend the $ABX_3$ perovskite particles, comprises one or more non-aqueous, electrically resistive liquids. Such a liquid or a liquid mixture, referring as the suspension medium, can maintain the suspended $ABX_3$ perovskite particles in gravitational equilibrium.

More specifically in this invention, the liquid suspension (300) comprises one or more a mineral resistive oil, a synthetic resistive oil and a vegetable oil. Mineral resistive oils, such as transformer oils; synthetic resistive oils, such as silicone oils, fluorocarbon organic compounds, plasticizers (such as dioctyl phthalate, dibutyl phthalate, diisobutyl phthalate, triisodecyl trimellitate (TDTM), dodecylhenzene, polybutene oil; vegetable oils, such as castor oil, soybean oil, rapeseed oil, are good liquid suspension medium. Technically, the liquid suspension medium used in the light valve of the present invention can be any liquid light valve suspension known in the art and can be formulated according to techniques well known to those skilled in the art.

According to this invention as illustrated in FIG. 1, the said transparent electrode (100) can be made of the same material or different materials, where light can be transmitted through, preferably having a light transmittance equals to or greater than 80%, more preferably 90%. Either the said transparent electrode (100) can be ITO conductive glass, ITO/PET conductive film, Ag nano wire/PET conductive film, Cu nanowire/PET conductive film. The transparent electrode (100) are preferred to be of the same material for the simplicity of processing and for the same physical properties (such as flexibility and thermal expansion), important for device durability under certain conditions, such as thermal stress.

As $ABX_3$ perovskite particles are sensitive to moisture and oxygen, the two transparent electrodes sandwiched by the liquid suspension can be sealed with a resistive material, such as epoxy resin, etc., which can be used to seal the sealing material around the two transparent electrodes. The light valve is driven by alternating current to adjust light transmittance, preferably 5-500V alternating current.

The invention will now be described in more detail with reference to the following examples. However, these examples are given for illustration only and are not intended to limit the scope of the present invention. All chemicals used in the examples are purchased from Sigma-Aldrich Company unless otherwise specified. In all these examples, all parts and percentages are by weight unless otherwise noted. The light transmittance and absorption spectrum of the LV device was measured by an Oceanview spectrometer.

EXAMPLE 1

Preparation of Cs-Oleate $Cs_2CO_3$ (4.07 g) was loaded into a 250 mL, 3-neck flask along with octadecene (50 mL, ODE) and oleic acid (11.088 g), and the mixture was dried for 1 h at 12.0° C. and then heated under Ar to 150° C. until all $Cs_2CO_3$ reacted with oleic acid. Since Cs-Oleate precipitates out of ODE at room temperature, it has to be preheated to make it soluble before usage.

EXAMPLE 2

Synthesis of $CsPbI_3$ Nanorods

N,N-dimethylformamide (100 mL, DMF) and $PbI_2$ 2.306 (5 mmol) were loaded into a 250 mL flask. Acetate acid 4.654g (77.5 mmol) and dodecylamine 0.797 g (4.3 mmol) were added. After complete solubilization of $PbI_2$, 5 mL Cs-Oleate solution was added (prepared as described Example 1). Then, the hybrid solution was added into a 5 L flask along with 4200 mL toluene.

Then, centrifuge the reaction solution at 5000G for 1.5 hours and discard the supernatant to yield the light control $CsPbI_3$.

Then, the $CsPbI_3$ were further dispersed with 500 mL of toluene, mixed well with shaking and sonication (referring as LCP-Example-2).

EXAMPLE 3

Synthesis of $CsPbBr_3$ Nanorods

In the same manner as in Example 2, only 1.835 g of $PbBr_2$ was used instead of 2.306 g of $PbI_2$. A toluene mixture containing $CsPbBr_3$ is referring as LCP-Example-3.

EXAMPLE 4

Preparation of LV Suspension Containing $CsPbI_3$ Nanorods

In the 250 ml round bottom glass flask was weighted 10 g of TDTM (triisodecyltrimellitate), and the LCP-Example-2 prepared in the Example 2 was added in portions. After thoroughly mixing by shaking, toluene was subsequently removed by a rotary evaporator for 3 hours at 80° C. to yield a LV suspension containing $CsPbI_3$ referred as LV Suspension Example-4.

EXAMPLE 5

Preparation of LV Suspension Containing $CsPbBr_3$ Nanorods

In the 250 ml round bottom glass flask was weighted 15 g of silicone oil, and the LCP-Example-3 prepared in the Example 3 was added in portions. After thoroughly mixing by shaking, toluene was subsequently removed by a rotary evaporator for 3 hours at 80° C. to yield a IV suspension containing $CsPbBr_3$ referred as IV Suspension Example-5.

EXAMPLE 6

LV Devices Made from LV Suspension-Example-4

Figure 2:
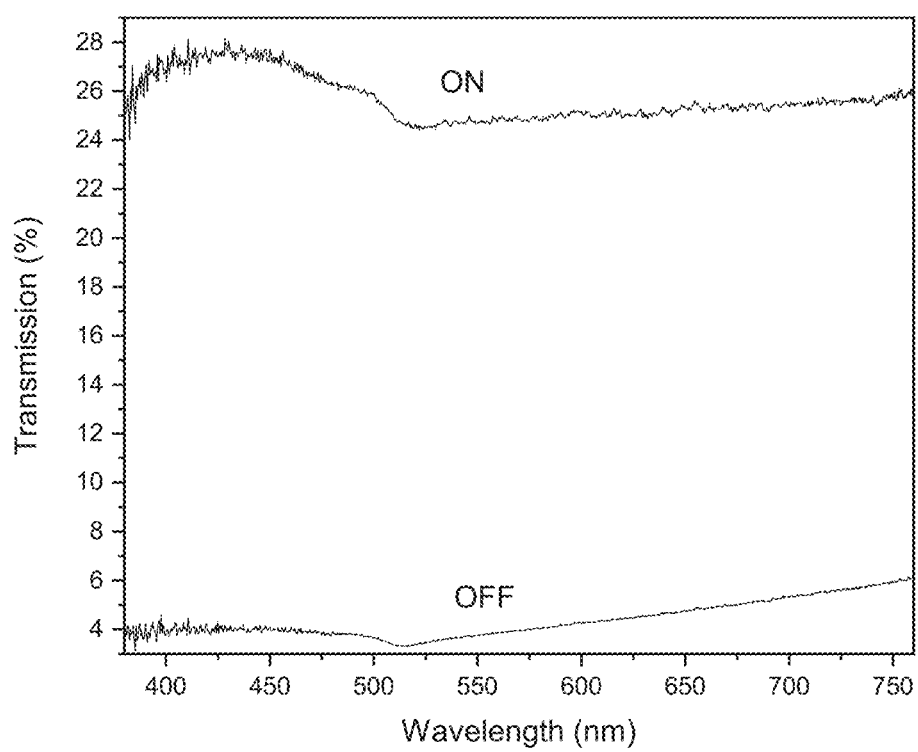
FIG. 2 presents light transmittance of a light valve (LV) device made according to this invention Example 6 before and after applying an electric voltage of 220V
Figure 3:
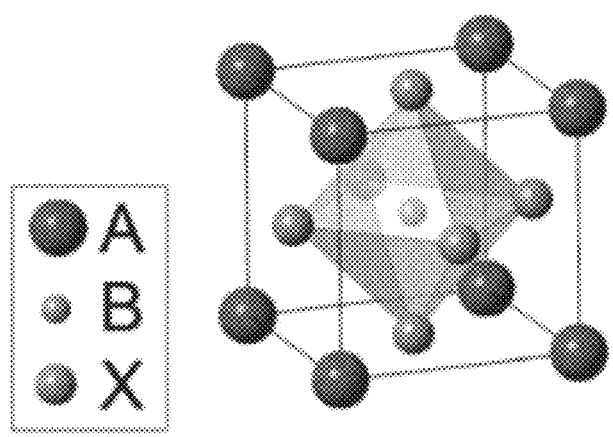
FIG. 3 presents the cell structure of the $ABX_3$ perovskite.

In this example, a wet thickness of 200 um of the IX Suspension-Example 4 made in Example 4 was sealed between two transparent electrodes of ITO conductive glass using epoxy resin to produce a light valve referring as LV Device-6. When no electric voltage is applied (OFF State), LV Device-6 exhibits an orange tint and light transmission is measured to be 4.7%. When it was electrically activated using 220 Volts AC at 50 Hz (ON State), the LV Device-6 turns clearer and light transmission is measured to be 25.6%. FIG. 2 presents the absorption spectrum of LV Device-6 at OFF state and ON state respectively.

EXAMPLE 7

LV Devices Made from LV Suspension-Example-5

In this example, a wet thickness of 180 um of the LV Suspension-Example 5 made in Example 5 was sealed between two transparent electrodes of ITO conductive glass using epoxy resin to produce a light valve referring as LV Device-7. When no electric voltage is applied (OFF State), LV Device-7 exhibits an orange tint and light transmission is measured to be 6.4%. When it was electrically activated using 220 Volts AC at 50 Hz (ON State), the LV Device-7 turns clearer and light ransmission is measured to be 30.2%.

TABLE 1

Typical performance of LV devices

| LV Device | Transmittance % | |
|---|---|---|
| | Off state | On state |
| LV Device-6 | 4.7 | 25.6 |
| LV Device-7 | 6.4 | 30.2 |

The invention claimed is:

1. A light valve, comprising a first layer of a transparent conductive substrate; an active layer containing $ABX_3$ perovskite particles suspended in a liquid suspension; and a second layer of a transparent conductive substrate, wherein the $ABX_3$ perovskite particles are halide $ABX_3$ perovskite particles, and wherein A is at least one of $Cs^+$, $CH_3NH_3^+$, and $Rb^+$; B is at least one of $Pb^{2+}$, $Ge^{2+}$, and $Sn^{2+}$; and X is at least one of $Cl^-$, $Br^-$, and $I^-$.

2. The light valve as recited in claim 1, wherein A is at least one of $Cs^+$ and $CH_3NH_3^+$; B is $Pb^{2+}$; and X is at least one of $Br^-$ and $I^-$.

3. The light valve as recited in claim 1, wherein the halide $ABX_3$ perovskite particles are uniformly dispersed in the liquid suspension.

4. The light valve as recited in claim 3, wherein the liquid suspension maintains capable of maintaining the suspended $ABX_3$ perovskite particles in gravitational equilibrium.

* * * * *